United States Patent
Torvinen

(12) 
(10) Patent No.: US 6,315,342 B1
(45) Date of Patent: Nov. 13, 2001

(54) APPARATUS AND METHOD FOR FEEDING OF PARTS WITH OPEN INTERNAL GEOMETRIES USING PRESSURIZED GAS

(75) Inventor: Jukka M. Torvinen, Raleigh, NC (US)

(73) Assignee: ABB T&D Technology Ltd., Zurich (CH)

( * ) Notice: Subject to any disclaimer, the term of this patent is extended or adjusted under 35 U.S.C. 154(b) by 0 days.

(21) Appl. No.: 09/472,366

(22) Filed: Dec. 23, 1999

(51) Int. Cl.[7] ............................................. B25J 15/00
(52) U.S. Cl. ........................................................ 294/64.3
(58) Field of Search ............................. 294/64.1, 64.2, 294/64.3, 1.1, 93; 414/752.1, 676

(56) References Cited

U.S. PATENT DOCUMENTS

| | | | |
|---|---|---|---|
| 3,438,668 | * | 4/1969 | Olsson et al. ........................ 294/64.3 |
| 3,523,706 | * | 8/1970 | Logue .................................. 294/64.3 |
| 3,539,216 | * | 11/1970 | Forcier ................................ 294/64.3 |
| 4,002,254 | * | 1/1977 | Olofsen ............................... 294/64.3 |
| 4,118,058 | * | 10/1978 | Rahn et al. .......................... 294/64.3 |
| 4,502,721 | * | 3/1985 | Savin-czeizler et al. ........... 294/64.3 |
| 4,604,024 | * | 8/1986 | Edwards et al. ..................... 294/1.1 |

OTHER PUBLICATIONS

Website address: www.funkandwagnalls.com/encyclopedia/low/articles/b/b003001158f.html Bernoulli's Principle. (1 page) (Dec. 15, 1999.

Website address: www.cord.edu/dept/physics/p128/lecture98_29.html "Fluid Dynamics," Physics 128 Lecture, Concordia College, Moorhead, MN—based on work by A. Aarons and E. Mazur. Some material from *Peer Instruction: A User Guide* by E. Mazur. Web Page last revised, Nov. 1998. (3 pages).

Website address: www.maths.unsw.edu.au/metweb/rm124/a611/node2.html Equations From Physics [Mar. 15, 1995]–5 pages (Dec. 15, 1999).

* cited by examiner

*Primary Examiner*—Dean J. Kramer
(74) *Attorney, Agent, or Firm*—Woodcock Washburn

(57) ABSTRACT

An apparatus allows the automated feeding and transporting of parts having open internal geometries using pressurized gas. The apparatus comprises a tip with a plurality of holes, one or more part rests, and a conduit to deliver a stream of pressurized gas. A part with open internal geometry is inserted atop of or through the tip. A stream of pressurized gas enters the interior cavity of the tip in a first direction. The holes extend from the interior surface of the tip to the exterior surface of the tip at an angle. This angle is sufficient to redirect the incoming flow of gas to a second direction having a vector component that is substantially opposite to the first direction. The stream of pressurized gas exits the holes of the tip and is subsequently directed to the internal surface of the part to be transported and/or feed. This stream of pressurized gas forces the part against the part rest thereby allowing the part to be transported and fed onto the workpiece. Once the stream of pressurized gas is decreased or removed, the part drops into position on the workpiece via gravity.

21 Claims, 5 Drawing Sheets

US 6,315,342 B1

APPARATUS AND METHOD FOR FEEDING OF PARTS WITH OPEN INTERNAL GEOMETRIES USING PRESSURIZED GAS

FIELD OF THE INVENTION

This invention relates to automatic part-feeding. More particularly, the invention relates to apparatus for using pressurized gas to automatically feed and transport parts having open internal geometries.

BACKGROUND OF THE INVENTION

Certain operations of an assembly line, such as resistance welding operations, require the automatic transportation and positioning of certain parts, such as pipe couplers, that have open internal geometries onto a workpiece. Typically, such parts are transported using a vacuum that holds the parts in place in the tip of the vacuum tube. The vacuum is constantly maintained on the part until it is correctly positioned onto the workpiece.

This method, however, requires expensive equipment, such as vacuum pumps and piping, to draw sufficient vacuum on the part. The piping along the line must be monitored continuously to ensure that there is no loss of vacuum pressure due to leaks throughout the system. To maintain the vacuum, pump motors need to be running for extensive periods of time during the operation. This increases the heat and wear on the pump motors and could lead to malfunctioning. Thus, the use of vacuum increases maintenance costs for the assembly line and is often a source of downtime due to system leaks and failures of vacuum pump motors. Additionally, the geometry of the part is critical because the vacuum can be lost due to variations in the part dimensions. This increases the cost of such parts because tighter tolerances must be maintained.

SUMMARY OF THE INVENTION

The present invention satisfies these needs in the art by providing apparatus for using pressurized gas to automatically feed and transport parts having open internal geometries. A tip having a hollow interior is installed onto an end of a pressurized gas hose. The tip has one or more holes extending from the interior portion of the tip to its exterior surface. The tip is inserted into or through a part having an open internal geometry. To hold the part in place, pressurized gas, such as air, flows in a first direction into the interior portion of the tip, and exits the tip, through the holes, in a direction having a vector component substantially opposite to the direction of the incoming flow. The part is thereby forced in a direction opposite the incoming flow, and held against one or more part rests by the pressurized air exiting the tip. When flow of air into the tip is stopped, the part can be dropped into place via gravity, or forced off the tip via a second stream of pressurized air in an opposing direction.

Thus, apparatus according to the invention comprise a pressurized air supply conduit having a tip, wherein the tip has a plurality of holes that extend from an interior portion of the tip to an exterior surface thereof The holes are disposed around the tip in a configuration such that air flowing in a first direction into the interior portion of the tip exits through the holes in a second direction that has a vector component substantially opposite to the first direction. The tip can also have one or more part rests, such as stop pins, ledge, rim or similar devices, that extend from the exterior surface of the tip so that a part through which or into which the tip is inserted can be held against the part rests by the air exiting from the holes.

Similarly, a method according to the invention comprises inserting such a tip into or through a part having an open internal geometry, directing an air flow into the tip in a first direction, whereby the air flow exits the tip through the holes in a second direction having a vector component substantially opposite the first direction, thus holding the part in place against one or more part rests. The method also includes moving the part to a desired location and removing the air flow, thereby releasing the part.

The present invention reduces manufacturing costs in several respects. First, the facility costs associated with the delivery of a pressurized gas such as air in comparison to vacuum are substantially reduced. Second, air delivery systems are more reliable and require less maintenance than vacuum transport systems thereby minimizing assembly line down time. Lastly, unlike vacuum systems, component part complexity is not critical in air delivery systems. Therefore, component part tolerances can be more relaxed and part costs can subsequently be reduced.

It is to be understood that both the foregoing general description and the following detailed description are exemplary and are intended to provide further explanation of the invention as claimed. The accompanying drawings are included to provide a further understanding of the invention. In the drawings, like reference characters denote similar elements throughout several views. It is to be understood that various elements of the drawings are not intended to be drawn to scale.

A more complete understanding of the present invention, as well as further features and advantages of the invention such as its application to other methods of automated part transport, feed, and delivery systems will be apparent from the following Detailed Description and the accompanying drawings.

Reference will now be made in detail to a presently preferred embodiment of the invention, an example of which is illustrated in the accompanying drawing.

DETAILED DESCRIPTION OF PREFERRED EMBODIMENTS

The present invention provides an apparatus for feeding and transporting parts with open internal geometry that uses pressurized fluid such as pressurized gas rather than vacuum pressure. More specifically, the present invention provides an apparatus, or tip, that is inserted into or through a part with an open internal geometry that holds the part that is to be fed in place via pressurized gas. A pressurized fluid, preferably a gas such as air, is directed into the tip, and subsequently the interior of the part, through one or more holes in the tip. The holes extend from the interior surface to the exterior surface of the tip at a certain angle. The arrangement of the holes redirect the flow of air as it exits the holes in a direction having a vector component substantially opposite to the incoming flow. As a result of this redirection in flow, the stream of air forces the part into a direction opposite the incoming flow. Part rests, such as stop pins, a ridge, ledge, lip or similar means, extend from the exterior surface of one end of the tip to prevent the part from being blown forward onto the work piece or into the assembly line during transport. After the flow of pressurized gas is stopped and/or the apparatus is removed, the part will drop into place via gravity to a locator pin. Alternatively, a second stream of pressurized gas, in a direction opposite the incoming stream of gas, can be used to force the part off the tip.

Figure 1:
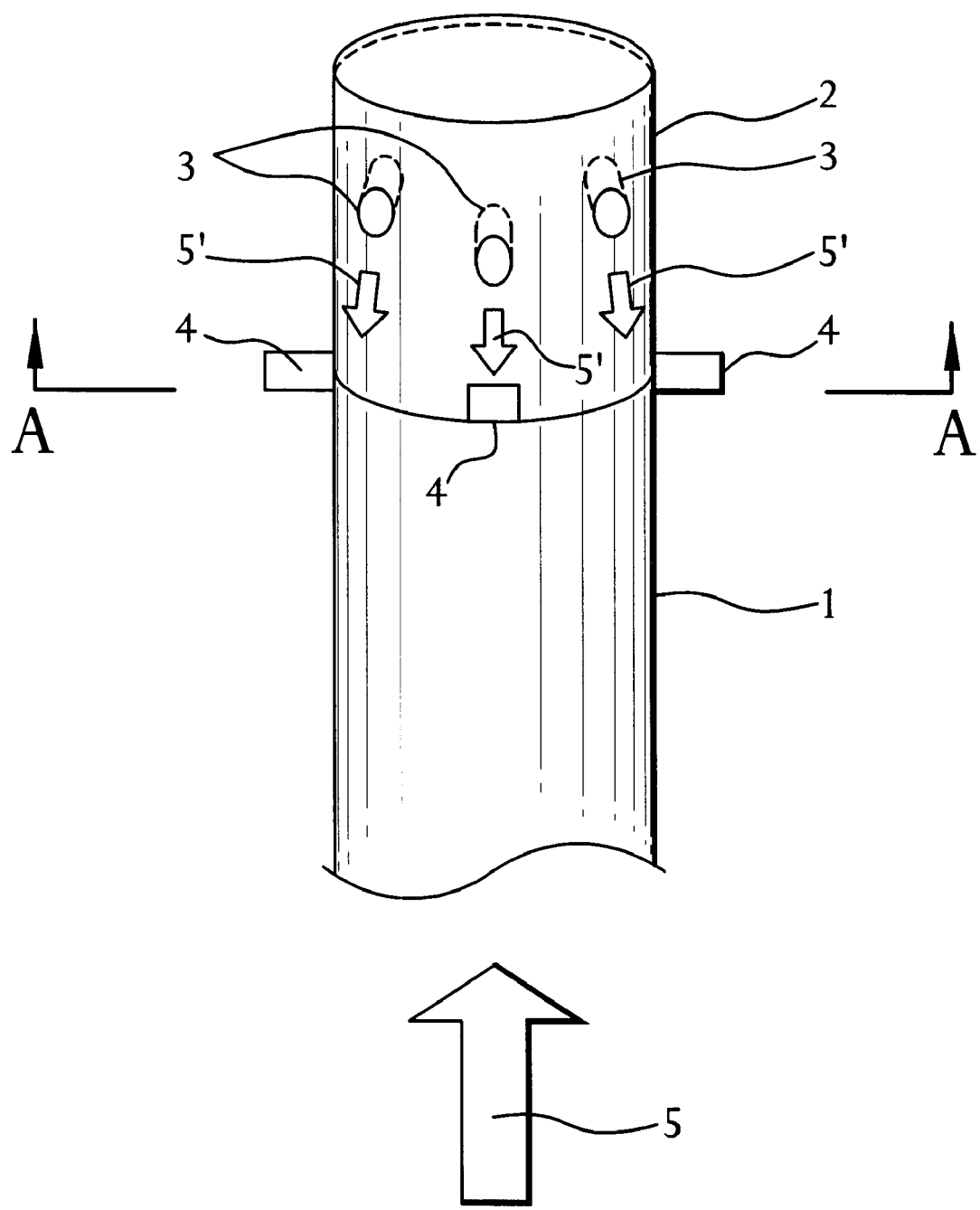
FIG. 1 provides an isometric view of an apparatus of the present invention.

FIG. 1 provides an illustration of the apparatus or tip used to facilitate the feeding and transporting of parts to various operations on the assembly line. As FIG. 1 illustrates, the apparatus comprises a conduit 1 and a tip 2 that is located at the end of the conduit. Conduit 1 and tip 2 could be integrated into a unitary piece or tip 2 can be attached to the end of conduit 1 by a coupler, disconnect, or similar means. Conduit 1 can be a hose, tube or hollow cylindrical shaft that is sufficient to accommodate the pressure of the incoming flow of gas. Conduit 1 can be comprised of materials such as, but not limited to, rubber, neoprene, or vinyl. Conduit 1 can be reinforced or unreinforced and terminate at one or both ends with a fitting, coupler, or similar means.

Figure 3:
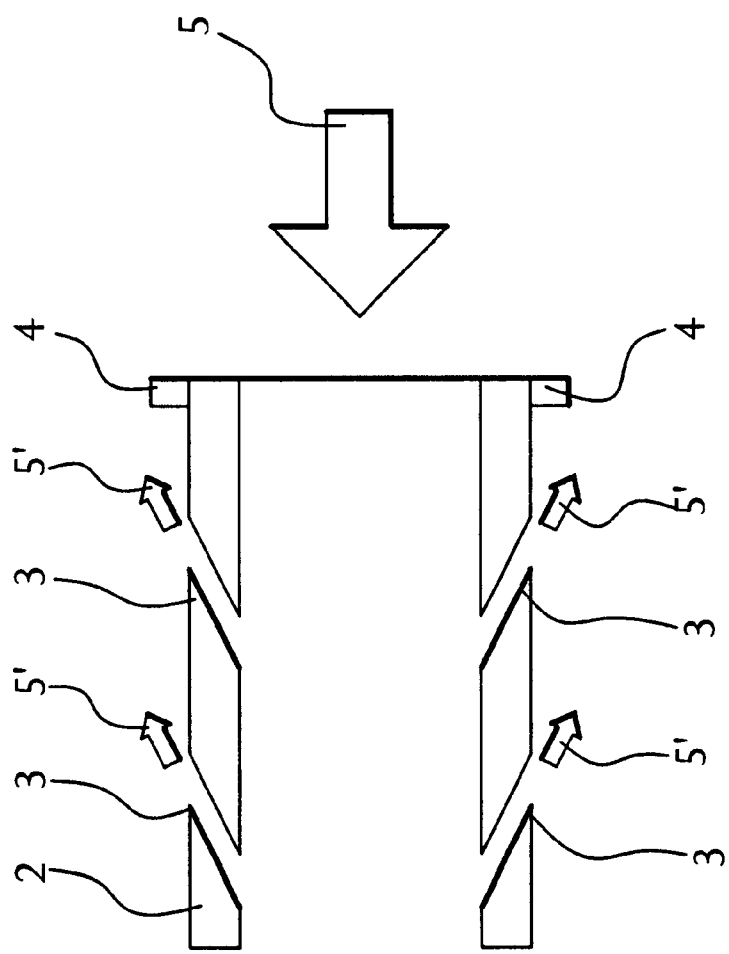
FIG. 3 provides a cross-sectional view of an apparatus of the present invention taken at line A—A of FIG. 1.

As FIG. 1 and FIG. 3 illustrate, tip 2 has an open interior and one or more holes 3 to accommodate the incoming stream 5 of pressurized gas. The number, location, and arrangement of holes 3 are determined by the weight and geometry of the part to be transported. In one embodiment, eight holes are equally distributed throughout the circumference of the tip in two even rows. It is understood, however, that the present invention is not limited to such an arrangement. Referring to FIG. 3 which provides a cross-sectional view of tip 2 taken at line A—A of FIG. 1, each hole 3 is slanted or angled from the internal surface to the external surface of tip 2. The effect of the angle is to change the direction of the incoming stream of pressurized gas. Pressurized gas or pressurized air is feed through conduit 1 and tip 2 in a first direction as illustrated by arrow 5. One or more holes 3 within tip 2 redirect the flow of gas stream 5 as it exits tip 2 into a second direction 5'. This second direction 5' has a vector component that is substantially opposite to the first direction 5 of the incoming gas or air stream.

Figure 2:
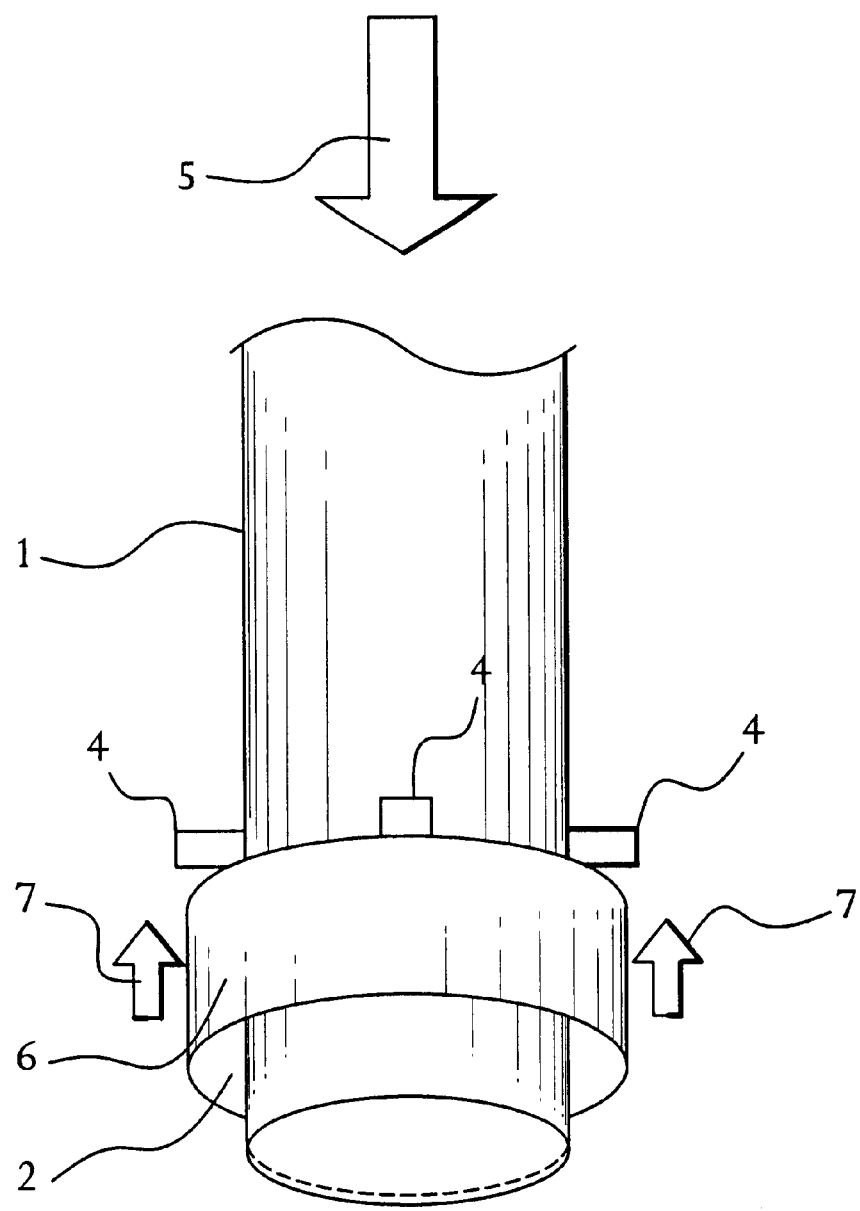
FIG. 2 provides an isometric view of an apparatus of the present invention with a part having an open internal geometry.

FIG. 2 provides an illustration of the apparatus or tip with a part 6 inserted through tip 2 during part feeding or transportation. FIG. 2 depicts the part being transported in a substantially vertical manner. It is understood that apparatus of the present invention can accommodate a variety of orientations. Part 6 can be, but is not limited to, a pipe coupler, ring, nut, bolt, washer, fastener, clamp, or any other component that has an open internal geometry. The internal diameter of part 6 is greater than the external diameter of tip 2 to accommodate insertion. Further, the internal surface of part 6 can be smooth, threaded, or having internal surface geometry depending upon design requirements. In preferred embodiments, the parts that are fed and/or transported are threaded.

Referring to FIG. 2, part 6 is placed over the holes 3 on tip 2. As pressurized gas or air exits holes 3 in direction 5', the stream of air acts upon the interior surface of part 6 forcing it against part rest 4 in the direction indicated by arrows 7. If incoming stream of gas 5 is insufficient, the pressure of gas 5 can be gradually increased to a level sufficient to force part 6 against part rest 4. Part rest 4 extends outwardly from tip 2 to a length sufficient to prevent part 6 from being blown off tip 2 during the transportation or feed of part 6 onto the workpiece. FIG. 1 through FIG. 3 depict part rest 4 as a plurality of stop pins. In other embodiments of the present invention, part rest 4 may be, but is not limited, to a ledge, ridge, or lip that extends outwardly from one end of tip 2. After the incoming flow of air 5 is removed or reduced, gravity will then drop part 6 into its correct location via a locator pin on the workpiece where the part is needed. Alternatively, or additionally, a second stream of pressurized gas can be employed to force part 6 off of tip 2.

Figure 4:
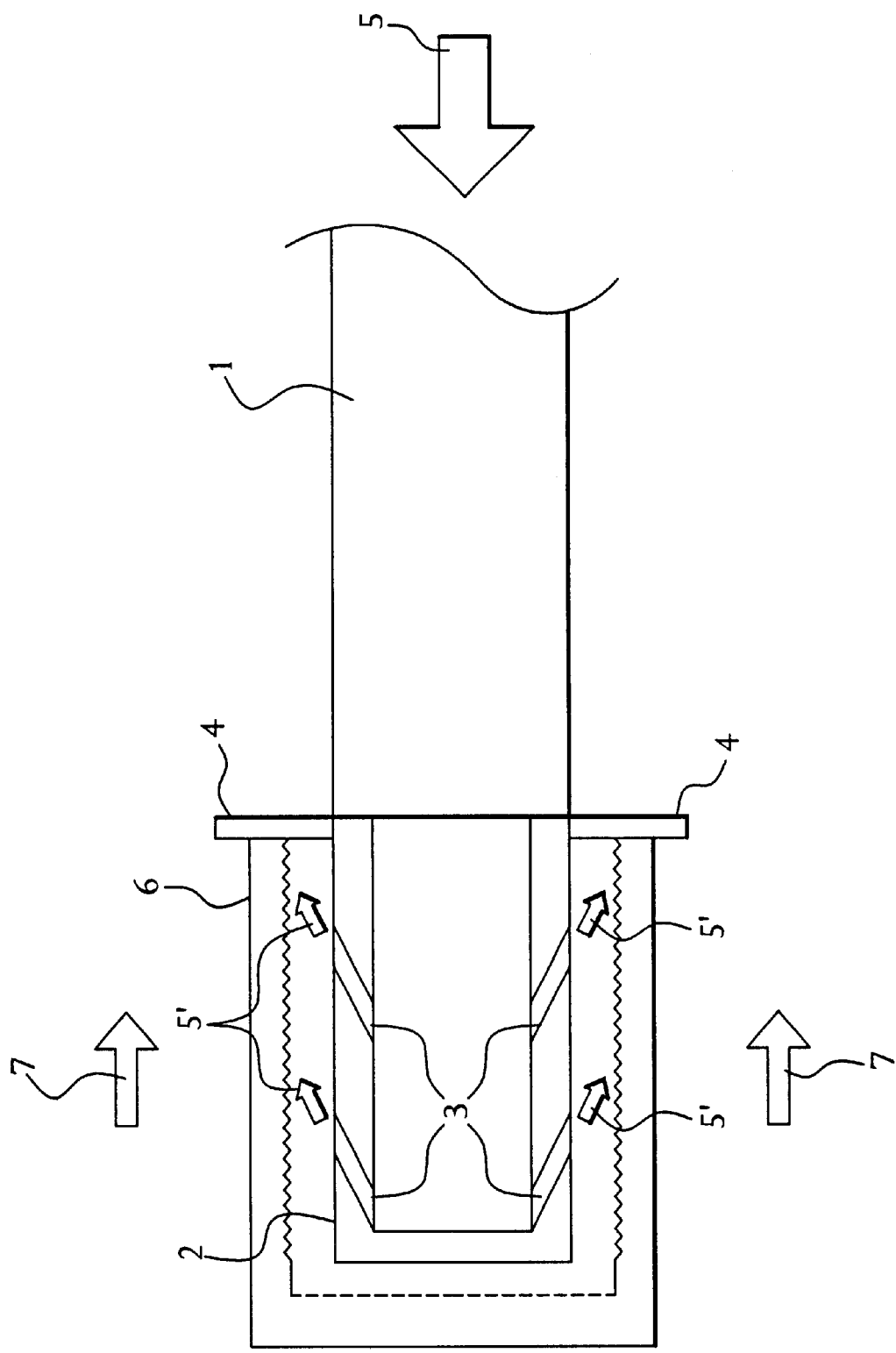
FIG. 4 provides a cross-sectional view of another embodiment of the present invention.

FIG. 4 provides a cross-sectional view of another embodiment of the present invention. In FIG. 4, tip 2 is shown as being close-ended. Part 6, which may be a close-ended nut or a similar part, is inserted into, rather than through, tip 2. Part 6 further has an interior surface that is threaded or has a surface geometry that promotes resistance to the incoming flow of pressurized gas. Tip 2 comprises one or more holes that extend at an angle from the interior surface to the exterior surface of tip 2. As in other embodiments, an incoming stream of pressurized gas such as air is directed through a conduit 1 and tip 2 in a first direction 5. As the stream flows through holes 3, it is redirected into a second direction 5' that is substantially opposite to the first direction 5. The stream exits holes 3 and into the interior surface of part 6 in second direction 5'. The pressurized gas stream forces part 6 against part rests 4 thereby holding part 6 in place. Part 6 can be feed and/or transported to subsequent operations. Once the flow of pressurized gas is decreased or removed, the part can be position in place onto the workpiece through gravity.

Figures 5A, 5B:
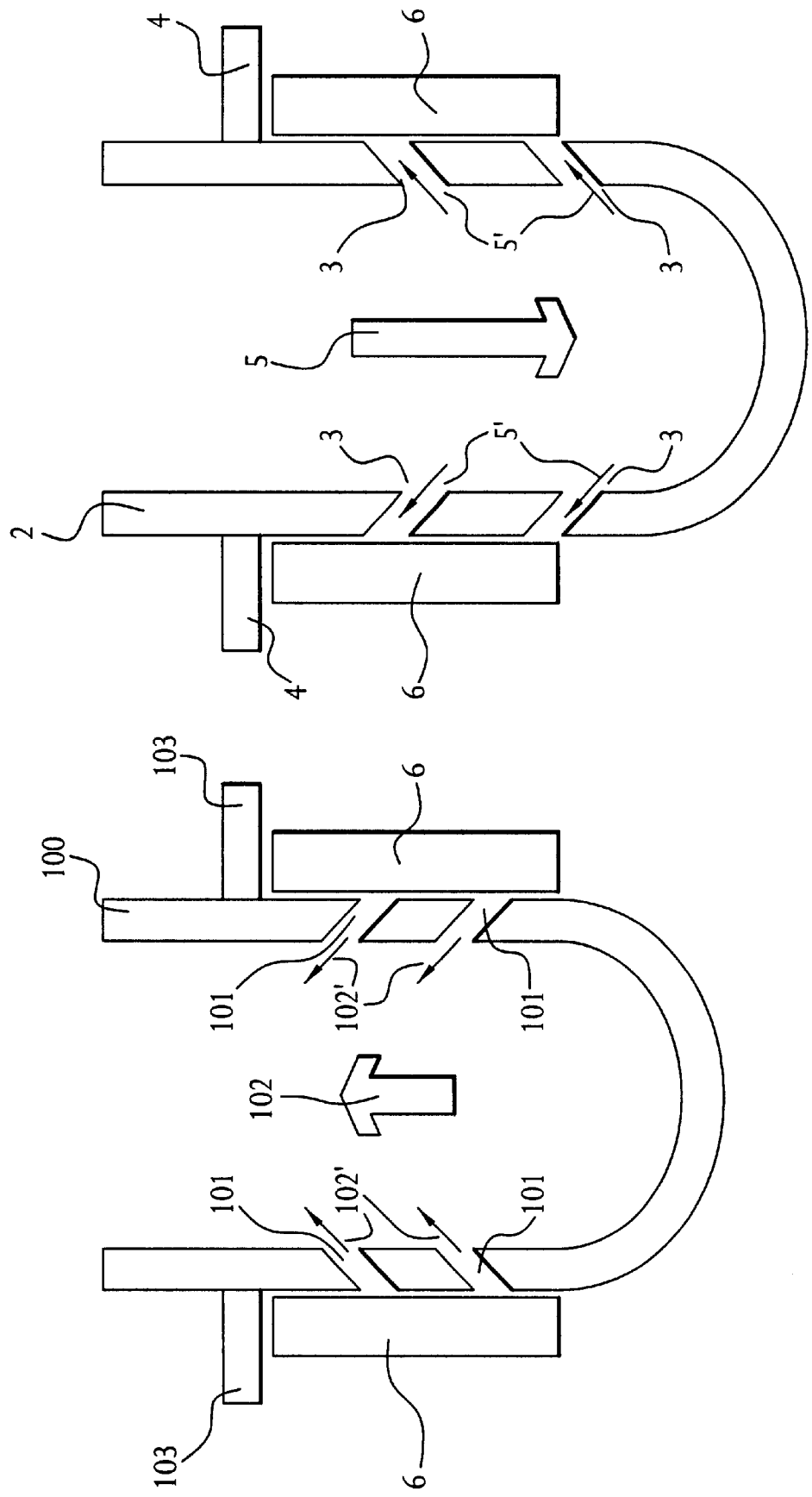
FIG. 5a provides a cross-sectional view of a vacuum-based apparatus of the prior art.
FIG. 5b provides a cross-sectional view of another embodiment of the present invention.

FIG. 5a and FIG. 5b provide cross-sectional views of a prior art, vacuum based apparatus and an embodiment of the present invention, respectively. FIG. 5a shows a cylindrical tip 100 of the prior art that has a closed end and a plurality of holes 101. Tip 100 is connected to a vacuum hose (not shown) that draws vacuum pressure upon part 6 in the direction indicated by arrow 102. Holes 101 are oriented in an angle to facilitate the vacuum draw 102' on the internal geometry of part 6. As a result of this vacuum force, part 6 is forced in the direction towards part rest 103. FIG. 5b shows an embodiment of the present invention. FIG. 5b overcomes the various problems of the prior art by using a pressurized fluid such as air rather than vacuum. Tip 2 has a closed, rounded end as shown. Like prior embodiments of the present invention, holes 3 are angled such that the direction of the incoming stream of pressurized gas 5 (fed into tip 2 by a conduit not shown) is directed into a second direction 5'. This second direction 5' acts upon the internal surface geometry of part 6 and forces part 6 up against part rest 4 thereby holding it in place.

In a further embodiment, a tip is mounted onto a cylindrical shaft. The part is mounted as before either onto or through the tip. A hollow tube or hose is inserted into the cylindrical shaft to direct a stream of pressurized gas into the interior of tip and subsequently the interior of the part through one or more angled holes on the tip. In this embodiment, the part may be transferred to subsequent operations along with the cylinder shaft.

The present invention is directed to parts and apparatuses used in the automated fabrication of large metal enclosures, that include, but are not limited to, electrical transformer tank enclosures, regardless of any specific description in the drawing or examples set forth herein. It will be understood that the present invention is not limited to use of any of the particular parts or assemblies discussed herein. Indeed, this invention can be used in any assembly line that requires automated feeding and delivery of component parts with open internal geometries to various assembly line operations. Further, the apparatus disclosed in the present invention can be used with the method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

I claim:

1. An apparatus for feeding and transporting a part having an open internal geometry and an internal diameter using pressurized fluid, said apparatus comprising:

a conduit that delivers a stream of pressurized fluid in a first direction;

a tip at one end of said conduit, said tip having a hollow interior with an internal surface and an external surface, said tip having an external diameter that is less than the internal diameter of said part, and said tip further comprising one or more holes which extend at an angle from said internal surface to said external surface such that said stream is directed into a second direction wherein said stream acts upon a portion of the internal geometry of said part; and one or more part rests that extend from the external surface of said tip wherein said part rest contacts a portion of said part.

2. The apparatus of claim 1 wherein said conduit is a hollow tube.

3. The apparatus of claim 1 wherein said pressurized fluid is pressurized gas.

4. The apparatus of claim 3 wherein said pressurized gas is air.

5. The apparatus of claim 1 wherein said tip is cylindrical-shaped.

6. The apparatus of claim 1 wherein said second direction comprises a vector component substantially opposite to said first direction.

7. The apparatus of claim 1 wherein said part rest is a plurality of pins.

8. The apparatus of claim 1 wherein said part rest is a lip that extends around the external surface of said tip.

9. An apparatus for feeding or transporting a part with open internal geometry and an internal diameter, said part comprising:

a conduit through which a stream of pressurized gas travels through in a first direction;

a tip at one end of said conduit, said tip having an external diameter that is less than the internal diameter of said part, said tip comprising a plurality of angled holes that redirect said stream in a second direction, said second direction comprising a vector component substantially opposite to said first direction wherein said stream acts upon a portion of the internal geometry of said part; and one or more part rests that extend from the exterior surface of said tip wherein said part rest contacts a portion of said part.

10. The apparatus of claim 9 wherein said conduit comprises a cylindrical shaft.

11. The apparatus of claim 9 wherein said part rest is a plurality of pins.

12. The apparatus of claim 9 wherein said part rest is a ridge.

13. The apparatus of claim 9 wherein said tip is open-ended.

14. The apparatus of claim 9 wherein said tip is close-ended.

15. An apparatus for transporting a part with open internal geometry and an internal diameter using pressurized gas, said apparatus comprising an conduit through which a stream of said pressurized gas travels in a first direction; a tip, said tip comprising an internal surface, an external surface, an external diameter that is less than the internal diameter of said part, and one of more holes, said holes extend from said internal surface to said external surface of said tip at an angle such that said stream of pressurized gas is forced into a second direction comprising a vector component substantially opposite to said first direction as it exits said holes wherein said stream acts upon a portion of the internal geometry of said part; and one or more part rests that extend from the external surface of said tip whereby said part is forced against said part rest upon action of said stream.

16. A method for transporting a part having an open internal geometry using pressurized gas, said method comprising the steps of:

a. inserting an apparatus comprising a part rest within the interior portion of said part;

b. directing a flow of gas into said apparatus in a first direction whereby said apparatus redirects said flow of gas that acts upon said interior portion of said part such that said part is forced in a second direction substantially opposite to said first direction against said part rest;

c. moving said part to a desired location; and d. removing said flow of gas thereby releasing said part.

17. The method of claim 16 further comprising the step of directing an additional flow of pressurized gas in a direction opposite said first direction.

18. The method of claim 16 wherein said apparatus comprises an interior portion for receiving a flow of gas and an exterior portion, said apparatus further comprising a plurality of holes that extend at an angle from said interior portion through said exterior portion.

19. The method of claim 16 wherein said apparatus is open-ended.

20. The method of claim 16 wherein said apparatus is close-ended.

21. The method of claim 16 wherein said pressurized gas is air.

* * * * *